(12) United States Patent
Fujita et al.

(10) Patent No.: US 7,298,242 B2
(45) Date of Patent: Nov. 20, 2007

(54) INPUT DEVICE WITH FINGERPRINT RECOGNITION

(75) Inventors: Yasushi Fujita, Kanagawa (JP); Shigeo Matsumoto, Kanagawa (JP); Katsumi Endo, Kanagawa (JP); Akira Kadonaga, Kanagawa (JP)

(73) Assignee: Sony Corporation (JP)

( * ) Notice: Subject to any disclaimer, the term of this patent is extended or adjusted under 35 U.S.C. 154(b) by 894 days.

(21) Appl. No.: 10/467,699

(22) PCT Filed: Feb. 7, 2002

(86) PCT No.: PCT/JP02/01037

§ 371 (c)(1),
(2), (4) Date: Aug. 8, 2003

(87) PCT Pub. No.: WO02/065268

PCT Pub. Date: Aug. 22, 2002

(65) Prior Publication Data

US 2004/0068660 A1     Apr. 8, 2004

(30) Foreign Application Priority Data

Feb. 9, 2001  (JP) ............................. 2001-034597
Jul. 17, 2001  (JP) ............................. 2001-217365

(51) Int. Cl.
*G05B 19/00*   (2006.01)
*H04K 9/00*    (2006.01)

(52) U.S. Cl. ..................... 340/5.83; 340/5.82; 713/186

(58) Field of Classification Search ............... 340/5.83, 340/5.82; 713/186
See application file for complete search history.

(56) References Cited

U.S. PATENT DOCUMENTS

| 5,341,421 A | 8/1994 | Ugon |
| 5,623,552 A * | 4/1997 | Lane ........................... 382/124 |
| 6,487,662 B1 * | 11/2002 | Kharon et al. ............... 713/186 |

FOREIGN PATENT DOCUMENTS

| JP | 4-4352 | 1/1992 |
| JP | 4-507162 A | 12/1992 |
| JP | 8-213768 A1 | 8/1996 |
| JP | 10-116486 A1 | 5/1998 |
| JP | 2000-76008 A1 | 3/2000 |
| JP | 2000-182025 A1 | 6/2000 |
| JP | 2000-194830 A1 | 7/2000 |
| JP | 2000-353235 A1 | 12/2000 |
| WO | WO-00/46659 A1 | 8/2000 |

* cited by examiner

*Primary Examiner*—Jeffery Hofsass
*Assistant Examiner*—Scott Au
(74) *Attorney, Agent, or Firm*—Lerner, David, Littenberg, Krumholz & Mentlik, LLP

(57) ABSTRACT

An input device having a fingerprint detection function is provided with operating portions for carrying out operations of a host device. The input device includes a device body connected to the host device, a fingerprint detecting portion provided in an upper surface of the device body and serving to detect the fingerprint of the user, and an opening portion for exposing the fingerprint detecting portion to the exterior.

9 Claims, 10 Drawing Sheets

INPUT DEVICE WITH FINGERPRINT RECOGNITION

BACKGROUND OF THE INVENTION

The present invention relates to an input device which can input operation signals to host equipment.

Electronic Data Interchanges (commercial dealings) carried out through a network such as the Internet, etc. are carried out by information processing apparatus such as personal computers, mobile telephones or PDAs (Personal Digital Assistants), etc. In Electronic Data Interchanges, in order to realize the safety of dealings, there are instances in which a fingerprint, which is one form of bio-identification information, is collated with fingerprints registered in advance to thereby carry out certification with respect to the opponents in the dealings. This fingerprint collation is carried out by ordinarily connecting a fingerprint collating device to an information processing apparatus.

Moreover, a mouse for specifying an operating position on a computer screen, a keyboard for inputting characters and/or symbols, etc., and a drive unit for loading an external memory device, such as a memory card, etc., are connected to the information processing apparatus as peripheral equipment.

However, since there ordinarily are only several connecting portions for connecting peripheral equipment provided in the information processing apparatus, there are instances where a fingerprint collating unit cannot be newly connected. Further, in order to connect a fingerprint collating device, it is difficult to carry out connection/exchange with respect to peripheral equipment already connected to the information processing apparatus. In addition, the peripheral equipment which has been detached from the information processing apparatus could not be used for that time.

Meanwhile, in general, fingerprint detection methods for realizing the fingerprint collation function include an optical detection method of picking up the image of a fingertip using an image pick-up device, and an electrostatic capacity detection method of forming a capacitor to detect differences in capacitance depending on the fingerprint. Further, in order to connect to the information processing apparatus as a peripheral device, the electrostatic capacity type is advantageous for the purpose of suppressing enlargement of the equipment. In the fingerprint detection method of the electrostatic capacity type, as shown in FIG. 12, a barrier metal 102 consisting of Ti, etc. is formed on a substrate 101 where there are formed elements such as transistors, etc. which constitute a fingerprint sensor 100. At the upper surface of the barrier metal 102, metallic wiring (Al wiring) 103 is formed. A passivation film 105 consisting of silicon nitride film or silicon oxide film is formed at the uppermost layer of the substrate 101.

At the fingerprint sensor 100, as the result of a finger touching the passivation film 105, a capacitor is formed between the Al wiring 103 and the finger. The distance d between each Al wire 103 and the finger changes in accordance with the uneven state of the finger resulting from the fingerprint. Accordingly, at respective capacitors constituting the fingerprint sensor 100, differences in capacitance occur in accordance with individual fingerprints. By detecting such differences, fingerprint recognition can be carried out.

However, when the finger of the user is charged with static electricity, the fingerprint sensor 100 cannot precisely detect differences in the capacitance of the respective capacitors produced by the presence or absence of the fingerprint, thus failing to precisely detect the fingerprint.

Further, when dust, etc. is deposited on the passivation film 105 of the fingerprint sensor 100, it is impossible to precisely detect the differences in capacitance of the respective capacitors, thus failing to precisely detect the fingerprint.

Also, in fingerprint detection by the optical detection method, when dust, etc. is deposited on the image pick-up unit, such as a CCD or line sensor, etc., it is impossible to precisely pick up the image of an upheaval (rising) line of a fingerprint, thus failing to precisely detect the fingerprint.

SUMMARY OF THE INVENTION

In view of the above, an object of the present invention is to provide an input device adapted so that an IC card having a fingerprint detection/collation function can be loaded therein to thereby have the ability to easily add a fingerprint detection/collation function to an information processing apparatus having a limited number of connecting portions for peripheral equipment.

Moreover, an object of the present invention is to enable an IC card having a fingerprint detection/collation function to be loaded in a mouse or keyboard, etc. that a user of an information processing apparatus frequently uses with his hand, thereby making it possible to easily carry out fingerprint detection/collation work.

Further, an object of the present invention is to provide an input device having a fingerprint detection/collation function which removes an electric charge on the fingertip of the user at the time of fingerprint detection to thereby have the ability to precisely detect fingerprints.

In addition, an object of the present invention is to provide an input device having a fingerprint detection/collation function which prevents dust, etc. from depositing thereon during times of non-use to thereby permit a sensor unit which detects fingerprints to be kept clean.

In order to attain the above-described objects, an input device according to the present invention includes a device body having an operating unit operatively connected to a host device for carrying out operations of the host device; an opening portion in the device body; and a fingerprint detecting portion assembled in the device body so as to be exposed externally of the device body through the opening portion, the fingerprint detecting portion serving to detect a fingerprint of a user.

In the input device according to the present invention constituted as described above, even in the case the host device has a limited number of connecting portions, an IC card having a fingerprint detection/collation function may be loaded with respect to a loading portion of the input device, thereby making it possible to easily add a fingerprint detection/collation function to the host device. Further, since this input device is a device that a user handles frequently during use of the host device, it is easy to press a fingertip onto the fingerprint detecting portion.

Further, the input device according to the present invention includes an opening portion arranged so that the fingerprint detecting portion is exposed externally of the device body, and a shutter member assembled to the device body and movable between a first position in which the opening portion is open, exposing the fingerprint detecting portion for use, and a second position in which the opening portion is closed so that fingerprint detection is not carried out. Accordingly, it is possible to prevent dust, etc. from being admitted and depositing on the fingerprint detecting portion.

In addition, in accordance with the input device of the present invention, the shutter member may be metallic, thereby making it possible to remove static electricity charged on the finger of the user before the detection of fingerprints. Accordingly, the fingerprint detecting portion can precisely detect the fingerprint of the user.

DETAILED DESCRIPTION

Figure 1:
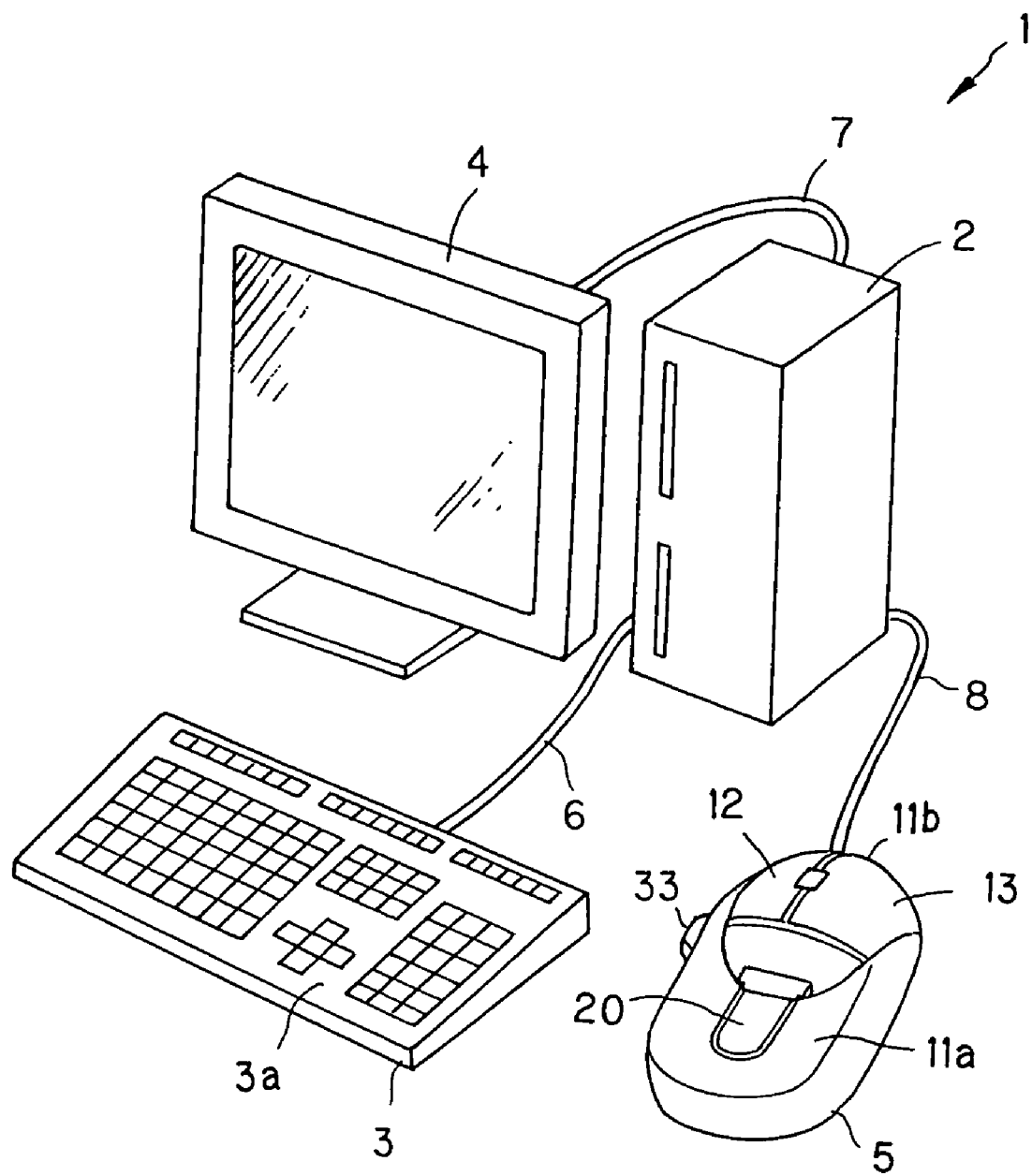
FIG. 1 is a schematic view of an information processing apparatus to which a mouse in accordance with the present invention is connected.

An explanation will now be given with reference to the attached drawings in connection with a mouse to which an input device according to the present invention is applied. As shown in FIG. 1, the mouse 5 is used in an information processing apparatus 1, such as a personal computer, mobile telephone and/or PDA, etc. The information processing apparatus comprises an apparatus body 2 which includes a hard disk, a CPU (Central Processing Unit), and a RAM (Random Access Memory), etc.; a keyboard 3 for inputting characters and/or symbols, etc.; a display unit 4 comprised of a CRT (Cathode-Ray Tube), a Liquid Crystal panel, etc. on which data, etc. processed by a computer are displayed; and the mouse 5 serving as a position input device (unit) for specifying an operating position on the screen of the display unit 4. The apparatus body 2 and the keyboard 3 are connected through a connection cable 6, the apparatus body 2 and the display unit 4 are connected through a connection cable 7, and the apparatus body 2 and the mouse 5 are connected through a connection cable 8.

Figure 2:
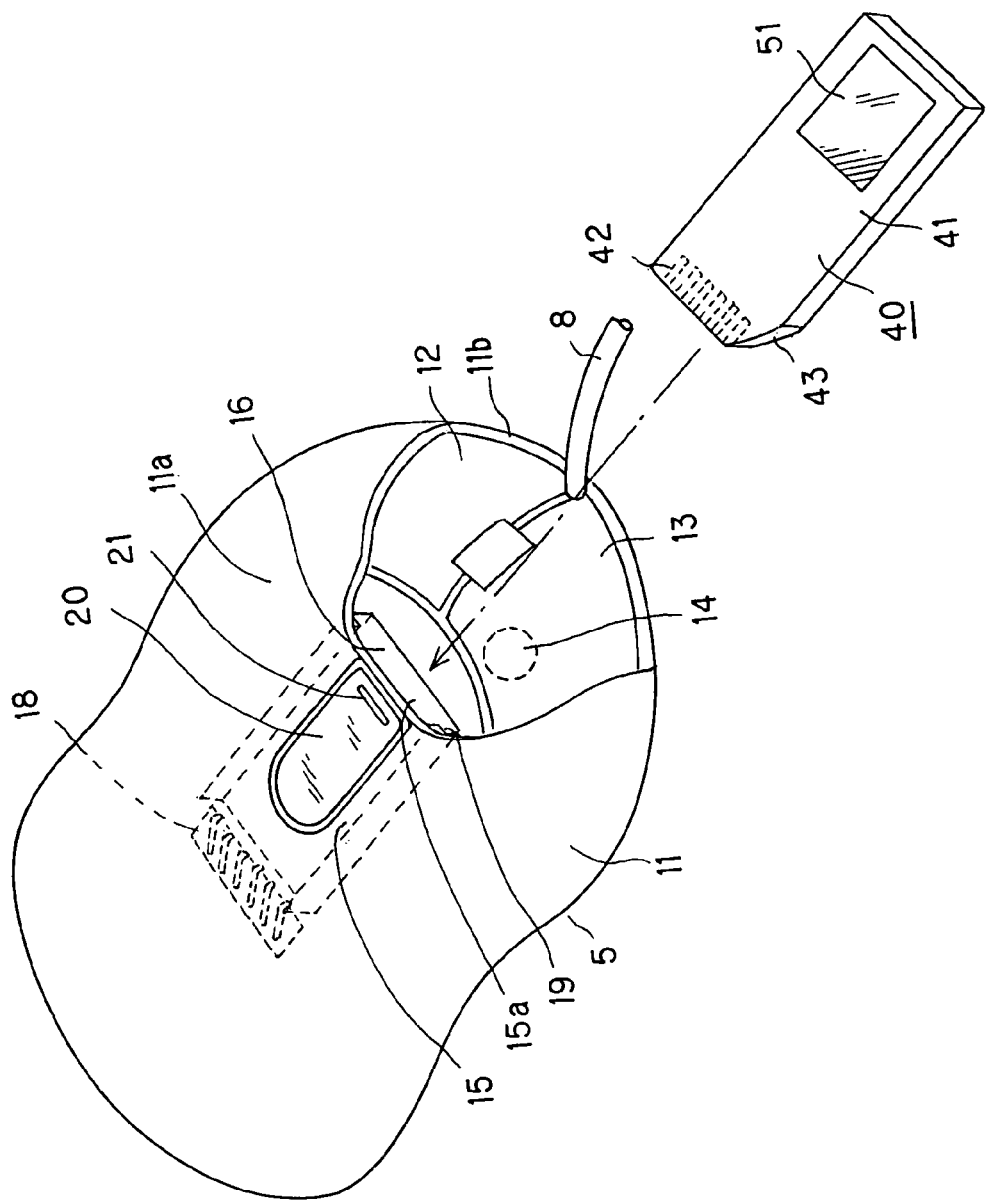
FIG. 2 is a perspective view showing the state in which an IC card is being loaded with respect to the mouse.

As shown in FIG. 2, the mouse 5 is formed from a resin material having rigidity, such as ABS resin, etc., and includes a casing 11 formed so that the upper portion 11a of the casing is curved so as to be easily grasped by the palm of the hand. At the front side of the casing 11 where fingertips are positioned when the mouse is grasped by the palm of the hand, there are provided a first operating portion 12 caused to undergo a pressing operation by a forefinger, etc., and a second operating portion 13 caused to undergo a pressing operation by a middle finger, etc. When the first operating portion 12 and the second operating portion 13 are pressed by the user, they respectively press a first switch element and a second switch element mounted on a printed circuit board disposed within the casing 11. Moreover, the connection cable 8 for carrying out the connection to the apparatus body 2 protrudes from a front end 11b of the casing where the first operating portion 12 and the second operating portion 13 are provided. This connection cable 8 is connected to the printed circuit board within the casing 11. Moreover, in order to carry out transmission of data to and reception of data from the apparatus body 2 of the information processing apparatus 1 by a serial interface, signal lines for a serial protocol bus state signal BS, a serial protocol data signal SDIO, and a serial clock signal SCLK, etc., and a power supply voltage VCC line and ground line, etc. are disposed in the connection cable 8. The ground line is connected to a shutter member 20 which will be described later. As a result of the fact that a finger comes into contact with the shutter member 20, static electricity charged on the finger of the user is removed from the fingertip, thus making it possible to precisely detect the fingerprint of the finger. By the connection cable 8, the mouse 5 and the apparatus body 2 are connected by an interface specification, e.g., USB (Universal Serial Bus), etc.

A detecting portion 14 for detecting the movement direction and movement quantity of a pointer indicating the operating position displayed on the screen of the display unit 4 is provided at substantially the central portion of the bottom surface of the casing 11. The detecting portion 14 is composed of a spherical body rotating in accordance with the operating direction imparted by a user, a first detection element for detecting a first rotation direction of the spherical body and the amount of rotation in the first rotation direction, and a second detection element for detecting a second rotation direction perpendicular to the first rotation direction and the amount of rotation in the second rotation direction. Further, when the first and second detection elements detect rotation of the spherical body, the detecting portion 14 moves the pointer displayed on the display unit 4 in the X-axis direction and in the Y-axis direction on the screen.

Further, the upper portion 11a of the casing 11 is provided with a loading portion 15 for loading the IC card for carrying out fingerprint collation. The loading portion 15 is continuous with an insertion hole 16 for the IC card provided in the upper portion 11a of the casing 11. The loading portion 15 is formed so as to be substantially the same size as the IC card. A bottom surface 15a of the loading portion 15 functions as a guide portion for carrying out insertion/withdrawal of the IC card. Further, a connector 18, serving as a connecting portion for realizing an electrical connection to the IC card, is provided at the innermost end of the loading portion 15. Further, a guide recessed portion 19 for guiding the insertion/withdrawal of the IC card and for limiting the loading position thereof is formed at the side surfaces of the loading portion 15, parallel to the insertion direction of the IC card.

The upper portion 11a of the casing 11 is also provided with a substantially rectangular opening portion 17 for allowing the fingerprint detecting portion of the IC card loaded with respect to the loading portion 15 to be exposed to the exterior. A side surface 17a of the opening portion 17 includes a curve protruding toward the exterior, and is adapted so that a fingertip is easily inserted in carrying out fingerprint collation and the user does not become tired in view of human-engineering. It is to be noted that the opening portion 17 is provided so that the connector 18 does not face the exterior, so the outward appearance of the mouse 5 is not negatively affected.

A shutter member 20 is disposed in the opening portion 17 so that it can open or close the opening portion. The shutter member 20 ordinarily closes the opening portion 17 to thereby prevent dust, etc. from infiltrating into the loading portion 15 and depositing on the connector 18 or the fingerprint detecting portion of the IC card. The shutter member 20 is formed from a conductive material such as a metallic plate, etc. grounded to the earth. The finger of a user comes into contact with the shutter member 20 before fingerprint detection is carried out to thereby enable the removal of static electricity charged on the finger. Thus, it is possible to precisely detect the fingerprint.

The shutter member 20 is formed with a substantially rectangular shape having substantially the same dimensions as the opening portion 17 which faces the fingerprint detecting portion of the IC card. As the opening portion 17 is opened, the fingerprint detecting portion is exposed to the exterior. A projecting portion 21 for opening/closing the shutter member 20 is formed at the end of the shutter member closest to the front end 11b of the casing 11. Accordingly, the user moves the projecting portion 21 toward the rear end 11c of the casing 11 using a finger, thereby making it possible to open the opening portion 17.

Figure 4:
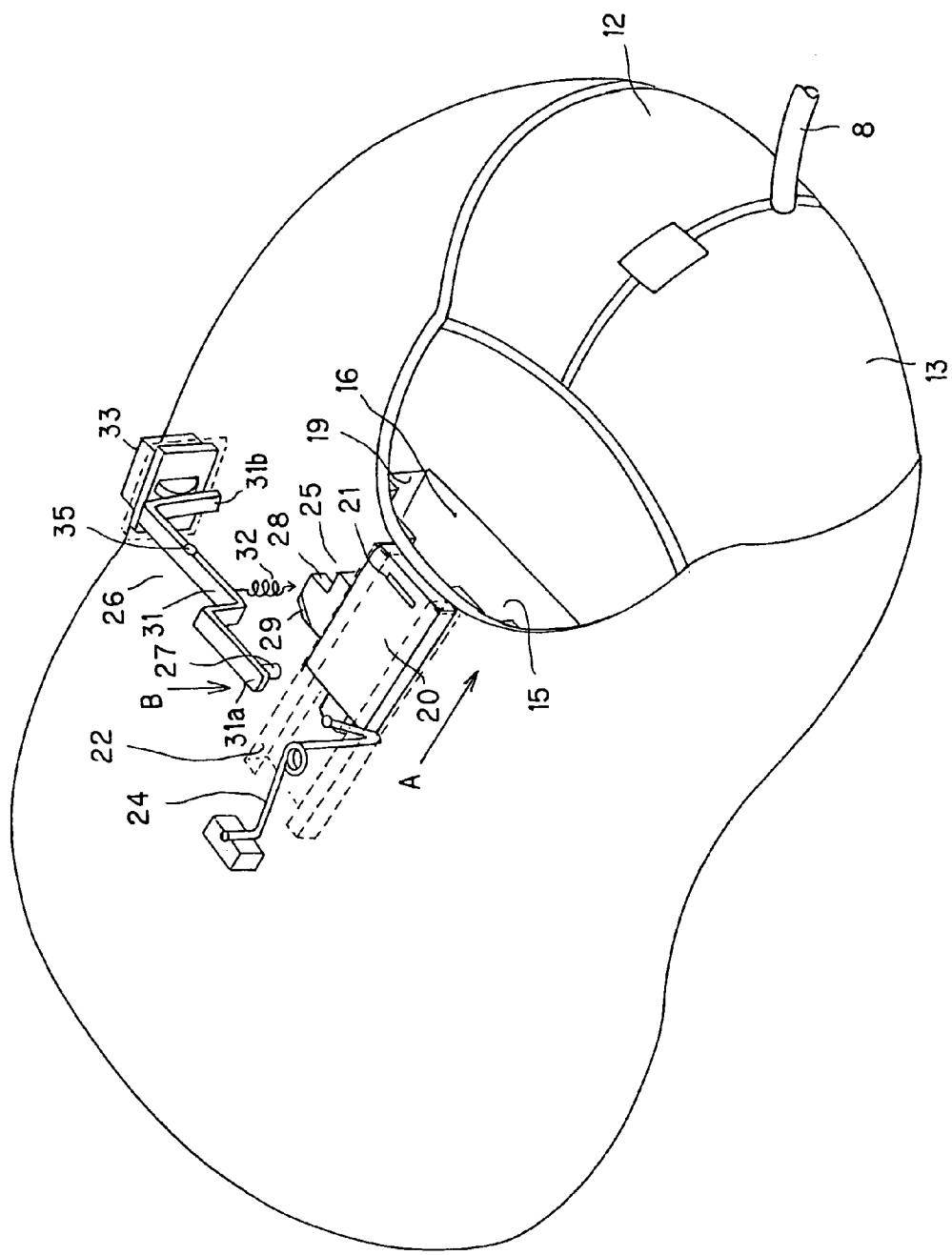
FIG. 4 is a perspective view showing the state in which an opening portion in the mouse is closed by a shutter member.
Figure 5:
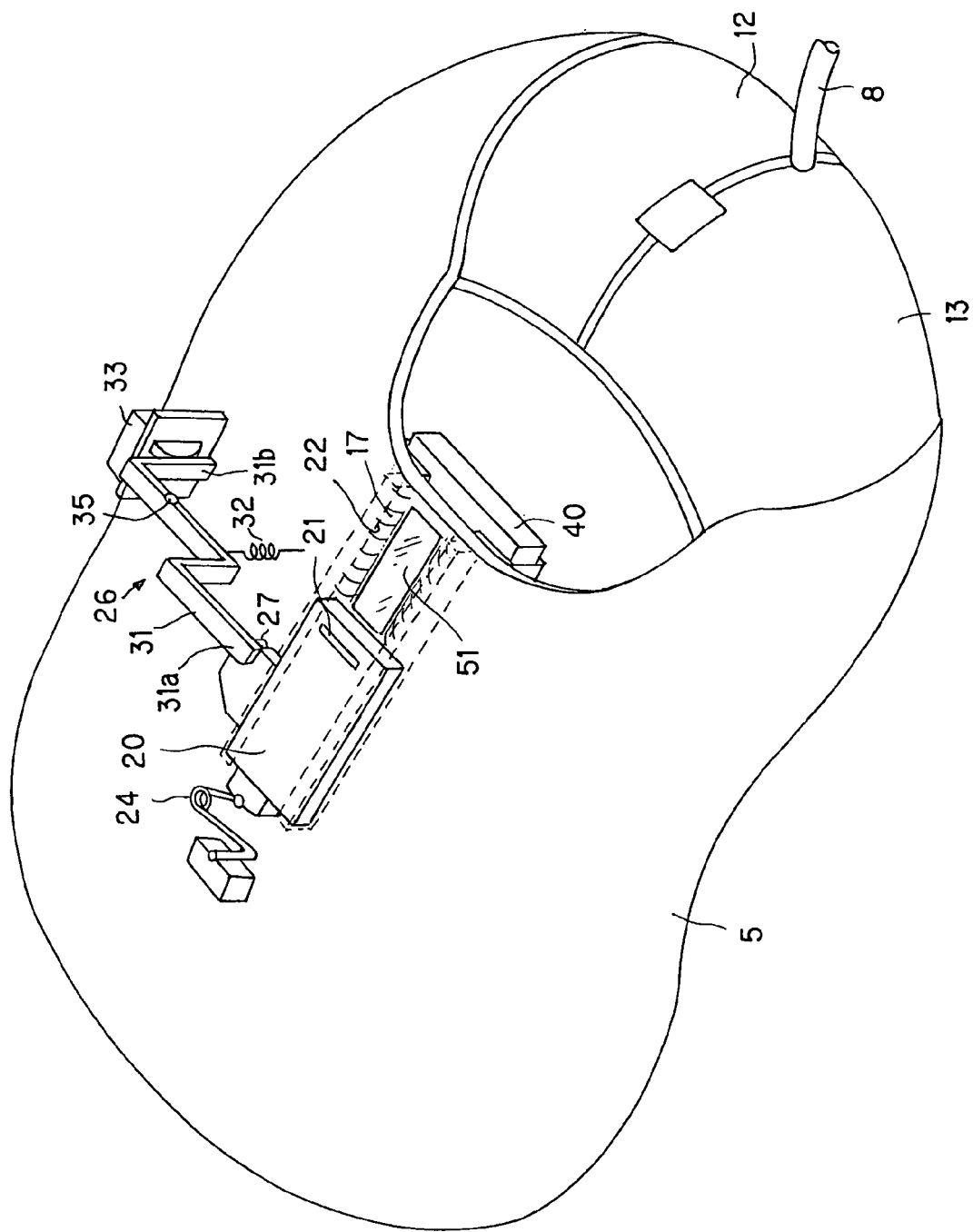
FIG. 5 is a perspective view showing the state in which the opening portion in the mouse is opened by the shutter member.

The engagement of a longitudinal side edge of the shutter member 20 with a guide portion 22 formed in the opening portion 17 in the movement direction of the shutter member 20 guides the opening/closing of the opening portion. Further, as shown in FIG. 4, one end of a biasing member 24, such as a torsion coil spring or a compression coil spring, etc., is provided at the end of the loading portion 15 closest to the rear end 11c and serves to bias the shutter member 20 in a direction to close the opening portion 17. Thus, the shutter member 20 is always biased in the closed direction indicated by arrow A in FIG. 4.

A holding piece 25 is formed on one longitudinal side edge of the shutter member 20. A holding member 26, to be descried later, holds the holding piece 25 in a position in which the shutter member opens the opening portion 17. A substantially L-shaped holding surface 28 is formed in the holding piece 25 in a direction facing the front end 11b of the casing 11, and an inclined surface 29 having a tapered shape is formed in the holding piece 25 in a direction facing the rear end 11c of the casing 11. When the shutter member 20 is moved in the direction opposite the direction indicated by arrow A in FIG. 4 to open the opening portion 17, the inclined surface 29 comes into contact with a projecting portion 27 on holding member 26 to pivot the holding member 26 in an upward direction. Continued movement of the shutter member 20 in the direction opposite the direction indicated by arrow A in FIG. 4 causes the projecting portion 27 of the holding member 26 to engage the holding surface 28 of the holding piece 25. Accordingly, the shutter member 20, biased in the direction indicated by arrow A in FIG. 4 by the biasing member 24, is held closer to the rear end 11c of the casing 11 in the state in which the opening portion 17 has been opened.

The holding member 26 which holds the holding piece 25 closer to the rear end 11c of the casing 11 comprises a projecting portion 27 which engages the holding surface 28 of the holding piece 25, a rotational arm 31 provided with the projecting portion 27 at the front end thereof, an extension coil spring 32 for biasing the rotational arm 31 in the direction indicated by arrow B in FIG. 4 to hold the holding piece 25, and a holding release button 33 adapted to press the rotational arm 31 to thereby move the projecting portion 27 in an upward direction and thereby release it from the holding state.

The projecting portion 27 projects from the lower surface of end portion 31a of the rotational arm 31. When the shutter member 20 is moved in the direction opposite to the direction indicated by arrow A in FIG. 4 to open the opening portion 17, the projecting portion 27 comes into contact with the holding piece 25 formed on the side edge of the shutter member 20, and is caused to ride onto the upper surface of the holding piece 25 by the inclined surface 29 formed with a substantially tapered shape. Further, as the result of the fact that the shutter member 20 is moved, the projecting portion 27 engages the holding surface 28 to hold the shutter member 20 closer to the rear end 11c of the casing 11 in the state in which the opening portion 17 is open.

The rotational arm 31 is formed by bending a plate-shaped body, and is adapted so that the projecting portion 27 is formed at one end portion 31a bent upwardly and the holding release button 33 which releases the holding state of the projecting portion 27 is disposed at the other end portion 31b bent downwardly. A supporting member (not shown) is inserted through a supporting portion 35 provided substantially at the center of the rotational arm 31, and the rotational arm 31 is rotatably supported by the supporting member. The extension coil spring 32 which biases the rotational arm 31 in the direction indicated by arrow B in FIG. 4 is held at the projecting portion 27 side by the supporting portion 35. Accordingly, the end portion 31a of the rotational arm 31 is always biased in the direction indicated by arrow B in FIG. 4 by the extension coil spring 32.

The holding release button 33 disposed at the other end portion 31b of the rotational arm 31 projects externally from the casing 11, and is adapted so that the user can operate it from outside the casing. When the holding release button 33 is pressed from the outside, it rotates the rotational arm 31 in the direction opposite to that indicated by arrow B in FIG. 4 with the supporting portion 35 being a pivot point. Namely, as a result of the end portion 31b being pressed by the holding release button 33, the rotational arm 31 is rotated in the direction opposite to that indicated by the arrow B against the biasing force of the extension coil spring 32. Thus, the projecting portion 27 projecting from the end 31a of the rotational arm 31 is moved in the direction opposite to that indicated by arrow B to release the holding state of the holding piece 25 and thereby move the shutter member 20 in the direction indicated by arrow A.

The shutter member 20 and the holding member 26 as described above operate as follows. First, the shutter member 20 is biased by the biasing member 24 in the normal state so that it is at the position where the opening portion 17 is closed. At this time, the holding member 26 is positioned at the side of holding piece 25 closest to the rear end 11c of the casing 11 so that the end portion 31a of the rotational arm 31 from which the projecting portion 27 projects is biased by the extension coil spring 32 in the direction indicated by arrow B in FIG. 4.

Then, in order to open the opening portion 17 to expose the fingerprint detecting portion of the IC card, the shutter member 20 is moved toward the rear end 11c of the casing 11. When the shutter member 20 is moved toward the rear end 11c, the projecting portion 27 comes into contact with the substantially taper-shaped inclined surface 29 formed at the side of the holding piece 25 facing the rear end 11c, and is caused to ride onto the upper surface of the holding piece 25. Further, when the shutter member 20 is moved toward the rear end 11c, the projecting portion 27 engages the holding surface 28 of the holding piece 25 as the result of the fact that the end portion 31a of the rotational arm 31 is biased by the extension coil spring 32. Thus, the shutter member 20 is held closer to the rear end 11c of the casing 11 as the result of the fact that the holding piece 25 is held by the projecting portion 27 against the biasing force of the biasing member 24. Accordingly, the opening portion 17 is opened so that the fingerprint detecting portion of the IC card loaded in the loading portion 15 is exposed. As a result, the user can easily carry out collation of his or her fingerprint.

Then, when fingerprint collation has been completed, the shutter member 20 is moved in the direction indicated by arrow A in FIG. 4 to close the opening portion 17 in order to protect the fingerprint detecting portion and the connector 18 from dust, etc. At this time, when the holding release button 33 protruding from the side surface of the casing 11 is pressed inwardly by the user, it presses the end portion 31b of the rotational arm 31. As a result, the end portion 31a is rotated in the direction opposite to that indicated by arrow B in FIG. 4 and against the biasing force of the extension coil spring 32, with the supporting portion 35 being a pivot point. Accordingly, the projecting portion 27 projecting from the end portion 31a is also moved in the direction opposite to the direction indicated by arrow B in FIG. 4, thereby releasing the holding surface 28 of the holding piece 25 from the holding state. Thus, the shutter member 20 is moved in the direction indicated by arrow A in FIG. 4 by the biasing force of the biasing member 24 to close the opening portion 17.

Next, the IC card 40 loaded with respect to the loading portion 15 will be explained with reference to FIG. 2. The IC card 40 includes a substantially rectangular plate-shaped card body 41 which constitutes a casing formed by molding a synthetic resin. Included within the card body 41 is a printed circuit board on which is mounted one or more semiconductor elements constituting a fingerprint sensor and control circuits therefor.

Terminal portions 42 comprised of plural electrodes are formed on one short side of the card body 41 so as to extend from the front end serving as the insertion end of the IC card 40 with respect to the loading portion 15 toward the bottom surface thereof. The transmission of data to and reception of data from the loading portion 15 is carried out by a serial interface. In a practical sense, the terminal portion 42 at least includes an input terminal for a serial protocol bus state signal, an input terminal for a serial protocol data signal, an input terminal for a serial clock and a power supply terminal.

Moreover, at one corner of the front end of the card body 41 where the terminal portions 42 are formed, a chamfered portion 43 is provided in order that the user can easily determine the insertion direction with respect to the loading portion 15. In addition, the upper surface of the card body 41 at the read end thereof is provided with a fingerprint detecting portion 51 adapted to detect the fingerprint of the user as the fingertip of the user is pressed against it.

Figure 3:
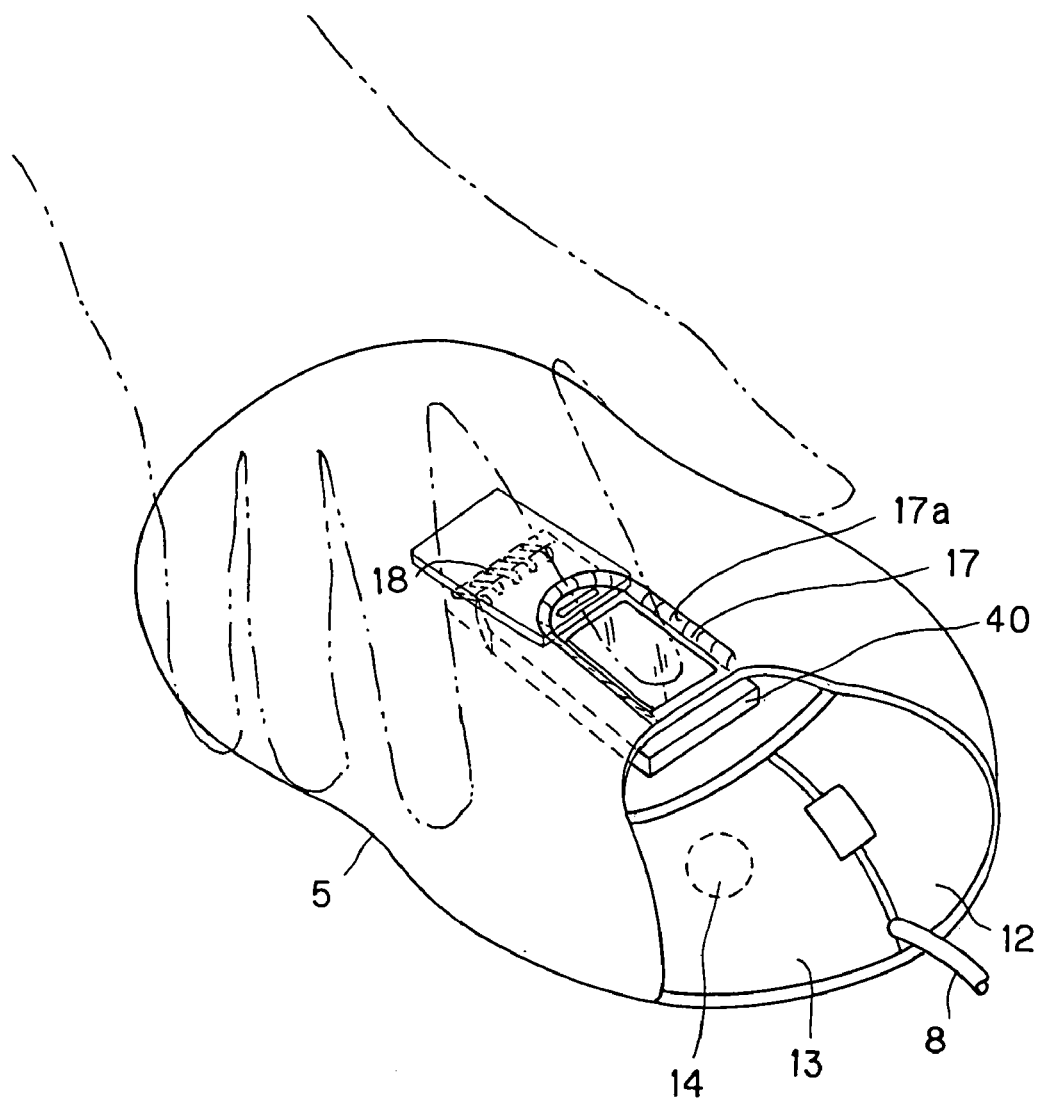
FIG. 3 is a perspective view showing the state in which the IC card has been loaded with respect to the mouse.

A method of inserting the IC card 40 as described above with respect to the loading portion 15 will now be explained. As shown in FIGS. 2 and 3, the IC card 40 is inserted into the insertion hole 16 of the casing 11 so that the upper surface of the card body 41 faces upwardly and the front end of the card body 41 at which the terminal portions 42 are provided is the insertion end. At this time, the IC card 40 is inserted into the loading portion 15 while being guided by the guide recessed portion 19 and the bottom surface 15a. Thus, the terminal portions 42 of the IC card are electrically connected to the connector 18 of the loading portion 15. The IC card 40 can be removed from the loading portion 15 by sliding the IC card 40 in the direction of the insertion hole 16.

It is to be noted that, in addition to the IC card 40 for fingerprint collation, an IC card having a memory element used as an external memory unit of the information processing apparatus 1 may be loaded with respect to the loading portion 15.

Figure 6:
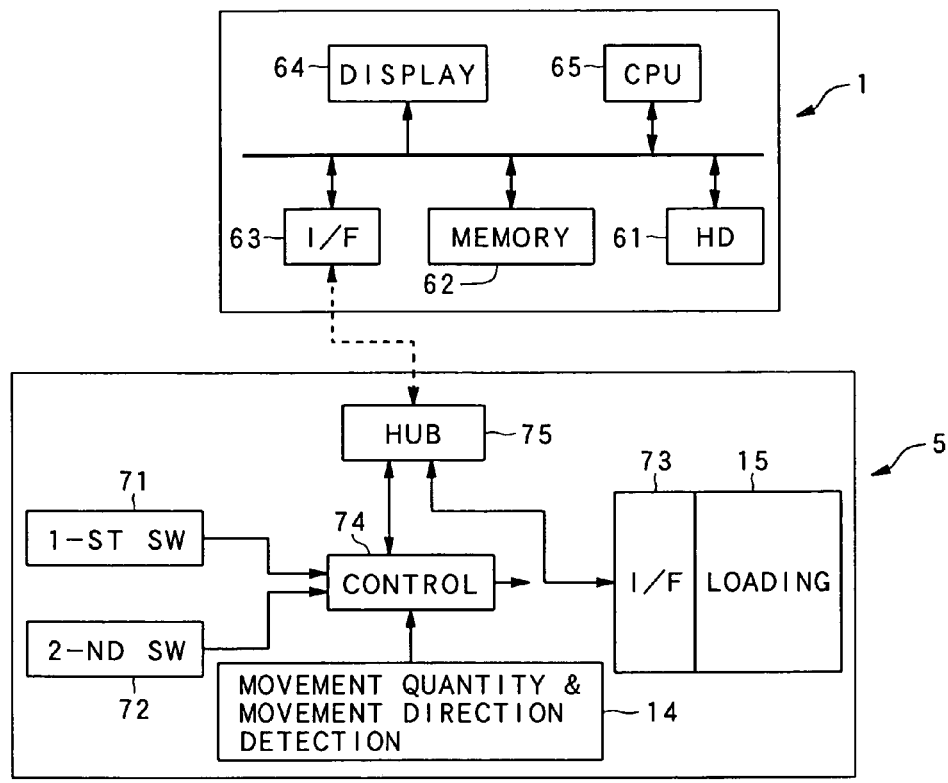
FIG. 6 is a block diagram explaining the circuit configuration of the information processing apparatus and the mouse.

The circuit configuration of the information processing apparatus 1 to which mouse 5 as described above is connected will now be explained. As shown in FIG. 6, the information processing apparatus 1 is an apparatus having substantially the same configuration as an ordinary personal computer, and comprises a hard disk 61 serving as a memory unit in which various application programs and/or processing data, etc. are preserved (stored), a Random Access Memory (hereinafter simply refereed to as a RAM) 62 in which programs, etc. preserved on the hard disk 61 are loaded, an interface 63 such as a USB, etc. to which keyboard 3 and/or mouse 5 are connected, a display unit 64 for displaying data, etc. to be processed, and a Central Processing Unit (hereinafter refereed to as a CPU) for controlling the entire operation of the information processing apparatus 1 on the basis of the programs, etc. loaded in the RAM 62. On the basis of input from the keyboard and/or the mouse 5, the CPU reads a predetermined application from the hard disk 61 into the RAM 62 to display it on the display unit 64 and to carry out data processing. The CPU 65 is adapted so that when a user attempts to access a specific computer, or attempts to access a specific file preserved on the hard disk 61, it displays its effect on the display unit 64 in order to carry out a request for certification by fingerprint collation. Only when the CPU 65 receives a certification signal from the IC card 40 indicating that certification has been obtained by fingerprint collation does it permit access to a specific computer or access to a specific file preserved on the hard disk 61.

The mouse 5 connected to the information processing apparatus 1 through the interface 63 comprises, as shown in FIG. 6, a first switch element 71 pressed by the first operating portion 12 provided in the casing 11, a second switch element 72 pressed by the second operating portion 13 provided in the casing 11, the detecting portion 14 for detecting the rotation direction and rotation quantity of the spherical body, a serial/parallel parallel/serial interface 73 for carrying out transmission of data to and reception of data from the IC card 40 loaded with respect to the loading portion 15, a control unit 74 for generating an operating signal output to the information processing apparatus 1 on the basis of signals input from the first switch element 71, the second switch element 72 and the detecting unit 14, and a hub 75 for selectively outputting a signal from the interface 73 and a signal from the control unit 74 to the information processing apparatus 1.

When an input is provided from the first switch 71, the control unit 74 generates a first operating signal to output it to the information processing apparatus 1 through the hub 75. When an input from the second switch element 72 is provided, the control unit 74 generates a second operating signal to output it to the information processing apparatus 1 through the hub 75. Moreover, when a rotation direction and rotation quantity of the spherical body are input from the detecting portion 14, the control unit 74 generates a third operating signal corresponding thereto to output it to the information processing apparatus 1 through the hub 75. The information processing apparatus 1 is supplied with the first to third operating signals from the mouse 5 through the interface 63. Thus, the CPU 65 carries out data processing corresponding to the first operating signal or the second operating signal, and moves a pointer displayed on the screen of the display unit 64 in accordance with the third operating signal.

Further, when the IC card 40 is loaded with respect to the loading portion 15 and a certification signal or non-certification signal is input from the IC card 40 through the interface 73, the hub 75 outputs these signals to the interface 63 of the information processing apparatus 1. At the information processing apparatus 1, when a certification signal is input through the interface 63, the CPU 65 permits access to a specific computer or access to a specific file preserved on the hard disk 61, etc. When a non-certification signal is input, the CPU 65 prevents access to a specific computer or access to a specific file preserved on the hard disk 61.

Figure 7:
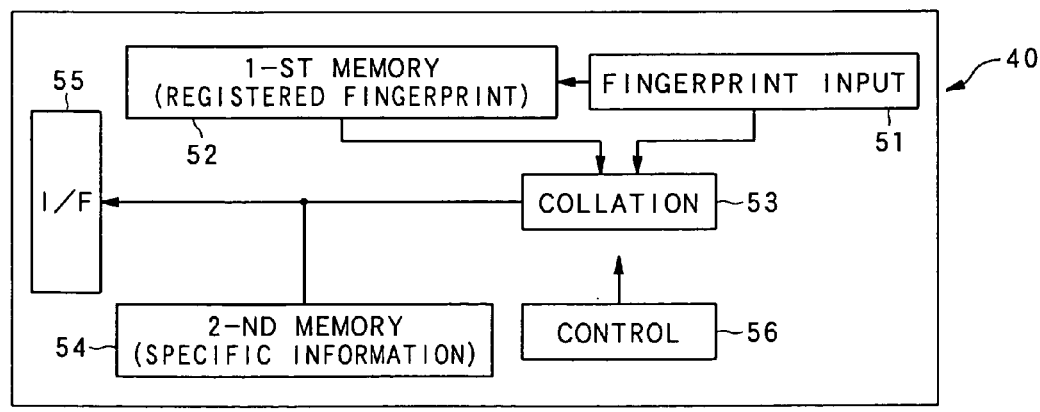
FIG. 7 is a block diagram explaining the circuit configuration of an IC card having a fingerprint collation function.

The circuit configuration of the IC card 40 loaded with respect to the loading portion 15 of the mouse 5 will now be explained. The IC card 40 comprises, as shown in FIG. 7, the fingerprint detecting portion 51 onto which the fingertip of the user is pressed, a first memory 52 for storing registered fingerprints, a collation unit 53 for collating fingerprints input from the fingerprint detecting unit 51 and fingerprints preserved in the first memory 52, a second memory 54 for storing the serial number of the IC card 40 and information relating to the fingerprints registered in the first memory 52, a serial/parallel parallel/serial interface 55 for carrying out transmission of certification signals to and reception of certification signals from the mouse 5, and a control unit 56 for controlling the entire operation of the IC card 40.

The fingerprint detecting portion 51 includes a fingerprint sensor in which a barrier metal consisting of Ti, etc. and/or metallic wiring such as Al, etc. are formed on a substrate in which elements such as transistors, etc. are formed. A passivation film consisting of an insulating material is formed at the uppermost layer of the substrate. As a result of a finger of the user pressing against the passivation layer, a capacitor is formed in the fingerprint sensor between the finger and the metallic wiring. Since the distance between each metallic wiring and the finger changes in accordance with the uneven state of the fingerprint, differences occur in the capacity of the respective capacitors constituting the fingerprint sensor. The fingerprint detecting portion 51 detects these differences to thereby extract feature points of the fingerprint, e.g., branch or center of skin upheaval lines. Further, when the fingerprint registration is carried out, the fingerprint detecting portion 51 outputs to the first memory 52 fingerprint data consisting of feature points of the fingerprint. The fingerprint data consisting of feature points of the fingerprint to be registered is preserved in the first memory 52 for every identification number. When fingerprint collation is carried out, the fingerprint detecting portion 51 outputs the fingerprint data to the collation unit 53.

When fingerprint collation is carried out, the collation unit 53 collates the fingerprint data input from the fingerprint detecting portion 51 and the fingerprint data stored in the first memory 52 to carry out certification of the user. When the fingerprint data which has been input from the fingerprint detecting unit 51 and the fingerprint data which has been read out from the first memory 52 correspond with each other indicating certification, the collation unit 53 outputs a certification signal to the interface 55. When the fingerprint data which has been input from the fingerprint detecting unit 51 and the fingerprint data which has been read out from the first memory 52 do not correspond with each other indicating no certification, the collation unit 53 outputs a non-certification signal to the interface 55.

Information relating to the fingerprint data registered in the first memory 52 is preserved in the second memory 54. Specifically, names or ID numbers of the fingerprint registrant and serial numbers of the IC cards are preserved in the second memory 54 as related information. Further, when a certification is made at the collation unit 53, the second memory 54 outputs to the interface 55, along with the certification signal, data of the user for which certification has been made.

The control unit 56 serves to control the entirety of the IC card 40, and drives the fingerprint detecting portion 51 when a fingertip is pressed onto the fingerprint detecting portion 51 and controls the operation of writing fingerprint data to be registered into the first memory 52, the operation of writing information relating to the registered fingerprint data into the second memory 54, and the operation of reading out this related information.

It is to be noted that the IC card 40 is driven by power supplied from the apparatus body 2 through the mouse 5. Of course, the IC card 40 may be driven by an included battery.

Next, a series of operations from the time the IC card 40 is loaded with respect to the loading portion 15 of the mouse 5 until fingerprint collation is carried out will be explained.

First, a method of loading the IC card 40 with respect to the loading portion 15 will be explained. As shown in FIGS. 2 and 3, the IC card 40 is inserted into the insertion hole 16 of the casing 11 so that the upper surface of the card body 41 faces upwardly and the front end of the card body 41 at which the terminal portions 42 are provided is the insertion end. At this time, the IC card 40 is inserted into the loading portion 15 while being guided by the guide recessed portion 19 and the bottom surface 15a. Thus, the terminal portions 42 of the IC card 40 are electrically connected to the connector 18 of the loading portion 15. When the IC card 40 is completely loaded with respect to the loading portion 15, the opening portion 17 is opened so that the fingerprint detecting portion 51 is exposed.

A method of registering a fingerprint with respect to the IC card 40 will next be explained. As shown in FIGS. 6 and 7, when the user operates the keyboard 3 or the mouse 5, the control unit 56 of the IC card 40 first receives a command from the information processing apparatus 1 to place it in a fingerprint registration mode. The user allows his fingertip to come into contact with the shutter member 20 to thereby remove static electricity charged on the finger, and thereafter to move the shutter member 20 toward the rear end 11c of the casing 11 so as to open the opening portion 17. Then, when the user inserts his fingertip through the opening portion 17 and into contact with the fingerprint detecting portion 51, the fingerprint detecting portion 51 detects any differences in capacitance taking place in the respective capacitors constituting the fingerprint sensor to thereby extract feature points of the fingerprint, e.g., branch or center of skin upheaval lines to generate fingerprint data. At this time, since any static electricity charged on the finger of the user has been removed by the shutter member 20, the fingerprint detecting portion 51 can precisely detect differences in capacitance and can precisely detect the fingerprint. Further, the fingerprint detecting portion 51 adds an ID number to the fingerprint data and outputs it to the first memory 52. Thus, the fingerprint data of the user is preserved, i.e., registered, in the first memory 52.

It is to be noted that information relating to the fingerprint data to be registered can be preserved in the IC card 40. Namely, in the information processing apparatus 1, the user operates the keyboard 3 or the mouse 5 to thereby input the name or ID number of the fingerprint registrant with respect to the IC card 40, thus making it possible to record this input data into the second memory 54 of the IC card 40 through the mouse 5 connected to the interface 63.

Next, a method of collating fingerprints will be explained. When a user attempts to access a specific computer, or attempts to access a specific file preserved on the hard disk 61, etc. through use of the keyboard 3 or the mouse 5 serving as an operating unit of the information processing apparatus 1, the CPU 65 displays a request for certification by fingerprint collation on the display unit 64 as shown in FIG. 6.

In response thereto, as shown in FIG. 3, the user removes static electricity and thereafter moves the shutter member 20 to open the opening portion 17. The user then inserts his fingertip through the opening portion 17 and presses it onto the fingerprint detecting portion 51 of the IC card 40 loaded with respect to the loading portion 15 of the mouse 5. The fingerprint detecting portion 51 detects any differences in capacitance taking place in the respective capacitors constituting the fingerprint sensor to thereby extract feature points of the fingerprint, e.g., branch or center of skin upheaval lines. From this, fingerprint data is generated and output to the collation unit 53. The collation unit 53 reads out registered fingerprint data from the first memory 52 and collates it with fingerprint data which has been input from the fingerprint detecting portion 51. When the fingerprint data which has been input from the fingerprint detecting portion 51 and the fingerprint data which has been read out from the first memory 52 correspond with each other indicating certification, the collation unit 53 outputs a certification signal to the interface 55. Along with this, the control unit 56 outputs to the interface 55 related information of the user for which certification has been made. When the information processing apparatus 1 has received the certification signal through the mouse 5, the CPU 65 permits access to a specific computer, or access to a specific file preserved on the hard disk 61.

Further, when the fingerprint data which has been input from the fingerprint detecting portion 51 and the fingerprint data which has been read out from the first memory 52 do not correspond with each other indicating no certification has been made, the collation unit 53 outputs a non-certification signal to the interface 55. When the information processing apparatus 1 has received the non-certification signal through the mouse 5, the CPU 65 prevents access to a specific computer, or access to a specific file preserved on the hard disk 61.

It is to be noted that the operation of removing the IC card 40 from the loading portion 15 can be carried out by sliding the IC 40 card in the direction of the insertion hole 16 through the opening portion 17.

An IC card having a memory element used as an external memory unit of the information processing apparatus 1 also can be loaded with respect to the loading portion 15. In this case, the CPU 65 executes an application program preserved on the hard disk 61 to thereby read out data, such as a file name or a data size, etc., from a memory element, such as a flash memory, etc., within the IC card. Further, in accordance with an operating signal input from the keyboard 3 or the mouse 5, the CPU 65 reads out data from a memory element of an IC card loaded with respect to the loading portion 15 of the mouse 5, and writes data into the memory element.

In accordance with the mouse 5 which is an input device of the information processing apparatus 1 as described above, even in the case in which the information processing apparatus 1 has only a few connecting portions which connect to the peripheral equipment, the IC card 40 having the fingerprint detection/collation function may be loaded with respect to the loading portion 15 of the mouse 5, thereby making it possible to easily add fingerprint detection/collation processing to the information processing apparatus 1.

Moreover, in accordance with the mouse 5 which is an input device of the information processing apparatus 1 as described above, since the shutter member 20 is provided in the opening portion 17 which faces the loading portion 15 in which the IC card 40 is to be loaded, it prevents dust, etc. from being admitted into the loading portion 15 when the IC card 40 is not loaded. Thus, it is possible to prevent the connector 18 from becoming coated by dust, etc. Further, when the IC card 40 is loaded in the mouse 5, it prevents dust, etc. from depositing on the fingerprint detecting portion. Thus, it is possible to precisely detect fingerprints. Further, since the shutter member 20 of the mouse 5 consists of a conductive material connected to the earth, if the user touches the shutter member 20 before detecting his fingerprint, it is possible to remove static electricity charged on his finger. Accordingly, in the fingerprint detection method using the electrostatic capacity detection method, it is possible to precisely detect differences in capacitance of the respective capacitors constituting the fingerprint sensor. Thus, it is possible to precisely identify fingerprints. In addition to the above, since the mouse 5 is the peripheral device that the user most frequently handles at the time of use of the information processing apparatus 1, and the operation of pressing the fingertip onto the fingerprint detecting portion 51 can be carried out by this mouse 5, convenience in use in carrying out fingerprint collation can be improved. Also, the loading portion 15 provided in the mouse 5 can be used for both the IC card 40 for fingerprint collation and the IC card for memory. In addition, since the opening portion 17 which faces the fingerprint detecting portion 51 is provided in the upper portion 11a of the casing 11, it is possible to easily carry out fingerprint collation work.

Figure 8:
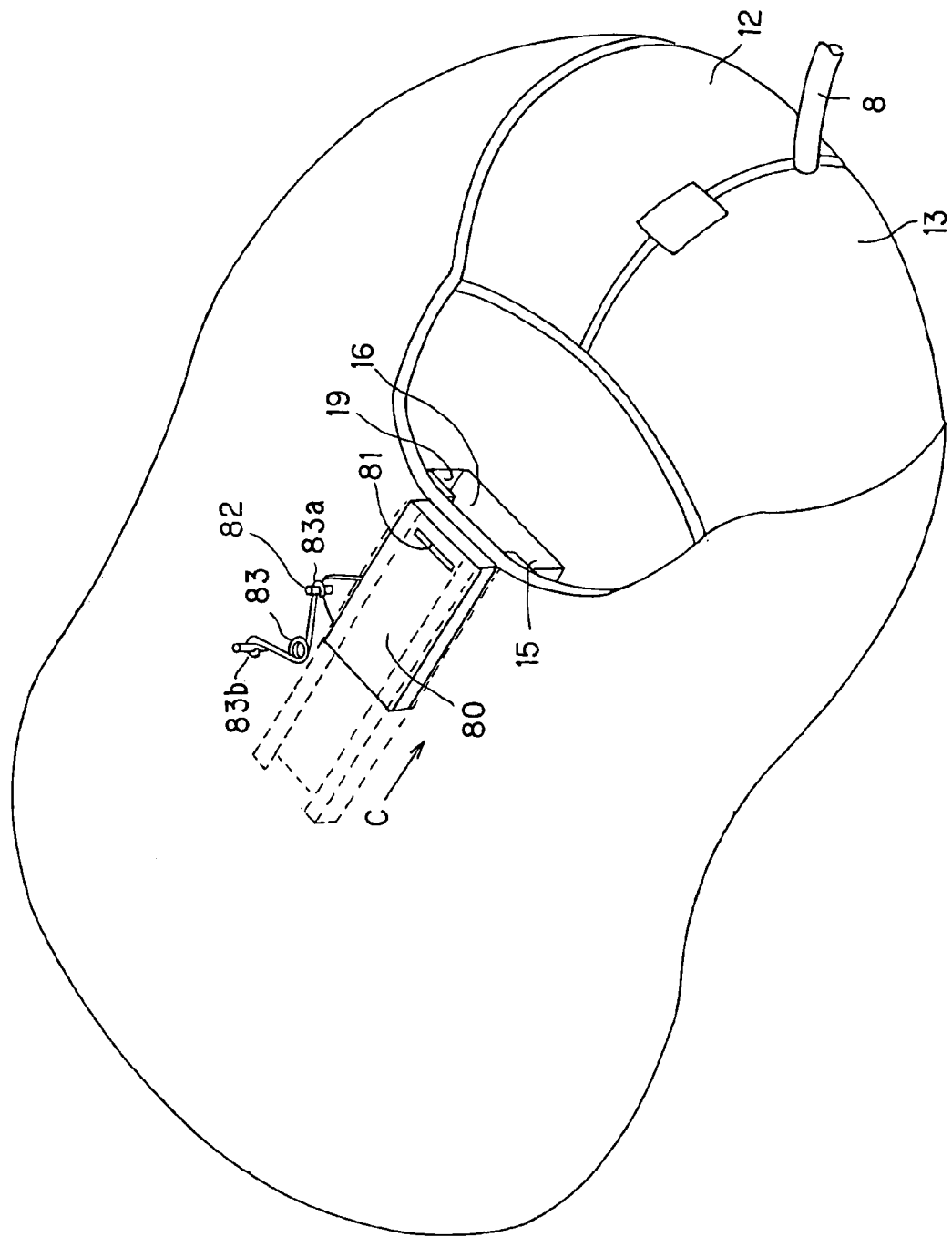
FIG. 8 is a schematic view showing an opening/closing operation of another shutter member.

The input device to which the present invention is applied also may be formed as follows. It is to be noted that the same reference numerals are respectively used for the same members as in the above-described mouse 5, and their detail will be omitted. As shown in FIG. 8, a shutter member 80 which opens or closes opening portion 17 of this mouse 5 is formed so as to have a substantially rectangular shape having substantially the same dimensions as the opening portion 17, similarly to the above-mentioned shutter member 20. A projecting portion 81 is formed on the shutter member 80 so as to face upwardly. Further, the shutter member 80 is formed from a conductive material such as a metallic plate, etc. grounded to the earth. The finger of a user comes into contact with the shutter member 80 before fingerprint detection is carried out, thereby making it possible to remove static electricity charged on the finger. Thus, it is possible to precisely detect the fingerprint.

The shutter member 80 is engaged with a guide portion 22 formed at a side edge portion of opening portion 17 so that the opening/closing of the opening portion 17 is guided. A holding portion 82 is provided on one side edge of the shutter member 80. The holding portion 82 holds a torsion coil spring 83 provided on one side of the loading portion 15 which feeds the shutter member 80 in the opening/closing directions.

Figure 9:
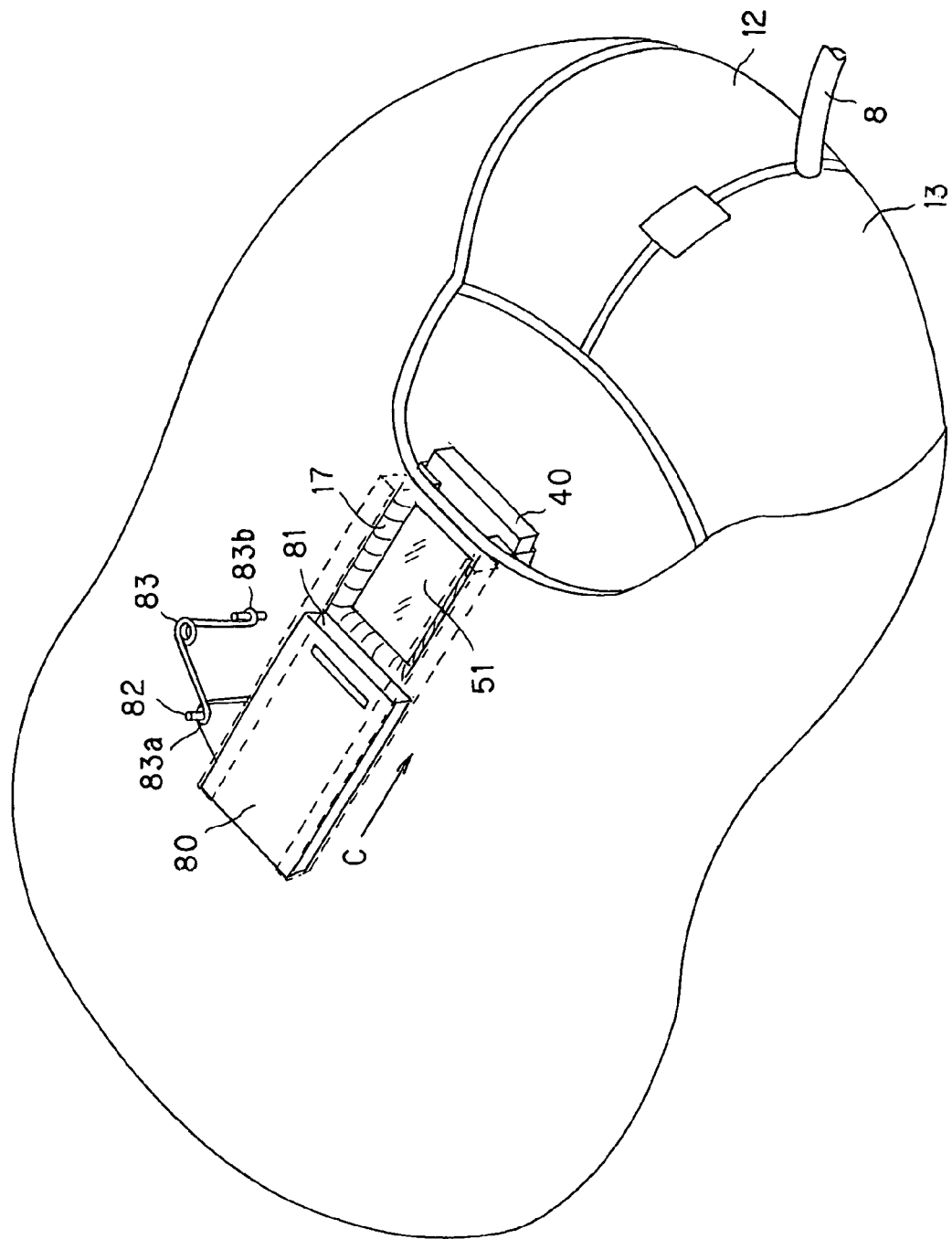
FIG. 9 is a schematic view showing an opening/closing operation of another shutter member.

The torsion coil spring 83 has one end portion 83a rotatably held at the holding portion 82 of the shutter member 80, and the other end portion 83b rotatably held at a holding projection of casing 11 (not shown). In the state in which the shutter member 80 closes the opening portion 17, the torsion coil spring 83 biases the shutter member 80 in the direction indicated by arrow C in FIG. 8 to close the opening portion 17 as shown in FIG. 8. However, when the shutter member 80 is placed in the state in which the opening portion 17 is open, the torsion coil spring 83 biases the shutter member 80 in the direction opposite to that indicated by arrow C in FIG. 9 to open the opening portion 17 as shown in FIG. 9. Accordingly, the shutter member 80 is fed in the opening or closing directions by the user until a middle portion at which the torsional coil spring 83 is inverted. As a result of the fact that the biasing direction is changed, the shutter member 80 is fed in the direction of rear end 11c or in the direction of front end 11b of the casing 11, thus making it possible to carry out opening/closing operations of the opening portion 17.

Namely, when the shutter member 80 is moved from the state in which the shutter member 80 closes the opening portion 17 toward the rear end 11c of the casing 11, the end portion 83a of the torsion spring 83 held by the holding portion 82 of the shutter member 80 is also moved toward the rear end 11c of the casing as shown in FIG. 9. As the end portion 83a passes the other end portion 83b held at the holding projection provided on the casing 11, the torsion coil spring 83 is inverted with the end portion 83b held at the holding projection acting as a pivot point. Thus, the torsion coil spring 83 biases the shutter member 80 toward the rear end 11c of the casing 11.

Further, when the shutter member 80 is moved from the state in which the opening portion 17 is open toward the front end 11b of the casing 11, the end portion 83a of the torsion spring 83 held by the holding portion 82 of the shutter member 80 is also moved toward the front end 11b of the casing, as shown in FIG. 8. As the end portion 83a passes the other end portion 83b held at the holding projection provided on the casing 11, the torsion coil spring 83 is inverted with the end portion 83b acting as a pivot point. Thus, the torsion coil spring 83 biases the shutter member 80 toward the front end 11b of the casing.

In an input device provided with such shutter member 80, it is possible to bias the shutter member 80 in the opening direction or in the closing direction of the opening portion 17 by the biasing force of the torsion coil spring 83. Accordingly, in such input device, the user first allows the shutter member 80 to undergo a feed operation, thereby making it possible to automatically open or close the opening portion 17. Moreover, in accordance with this input device, since the shutter member 80 is provided in the opening portion 17 which faces the loading portion 15 in which the IC card 40 is to be loaded, it prevents dust, etc. from being admitted into the loading portion 15 when the IC card 40 is not loaded therein. Thus, it is possible to prevent the connector 18 from becoming coated by dust, etc. Further, in accordance with this input device, when the IC card 40 is loaded within the loading portion 15, it is possible to prevent dust, etc. from being deposited on the fingerprint detecting portion 51. Thus, it is possible to precisely detect fingerprints. Further, since the shutter member 80 consists of a conductive material connected to the earth, if the user contacts the shutter member 80 before fingerprint detection, it is possible to remove static electricity charged on his finger. Accordingly, in the fingerprint detection method using the electrostatic capacity type detection method, it is possible to precisely detect differences in capacitance of the respective capacitors constituting the fingerprint sensor. Thus, it is possible to precisely identify fingerprints.

Figure 10:
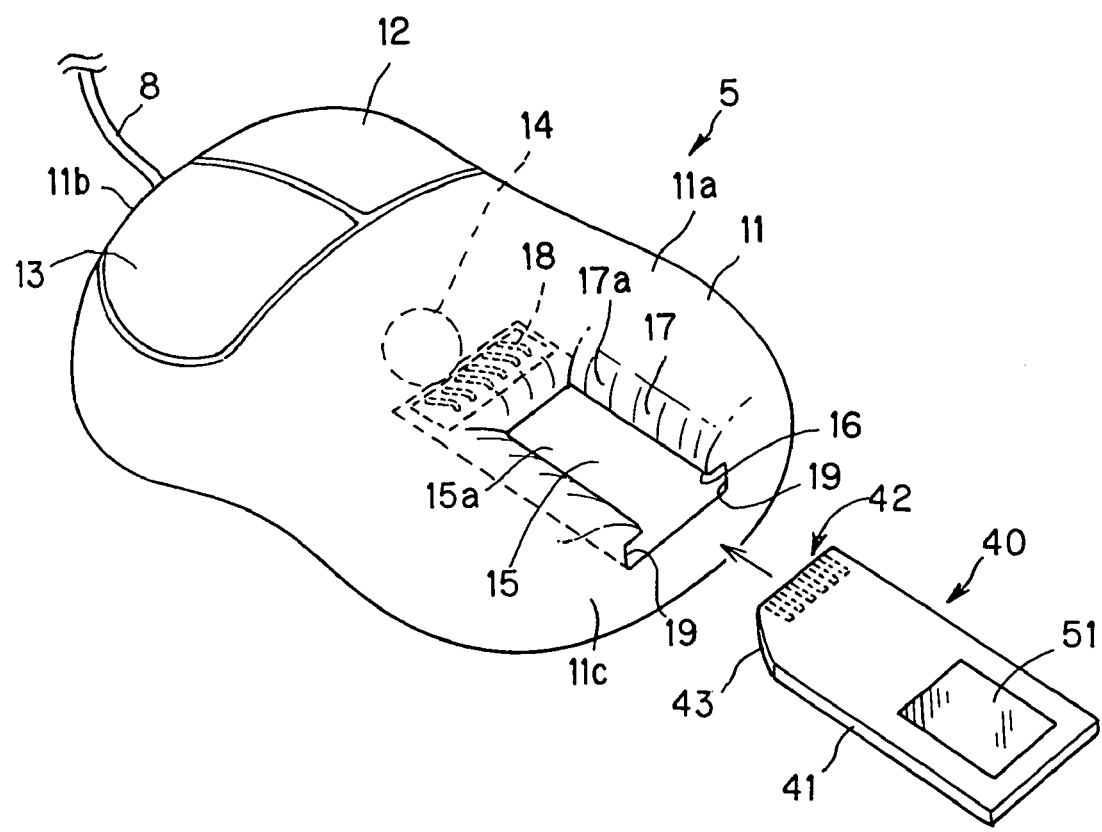
FIG. 10 is a perspective view showing another input device to which the present invention is applied.

It is to be noted that while an explanation has been given of an input device adapted so that an IC card having a fingerprint collation function is loaded from the front end 11b side of the casing 11 of the mouse 5, the present invention may be adapted so that the IC card 40 is loaded from the rear end 11c side of the casing 11, as shown in FIG. 10. Moreover, in the present invention, the opening portion 17 may be open at all times without providing the shutter member 20. It is to be noted that while an example has been explained in which the mouse 5 is provided with a loading portion 15 having an IC card 40 with a fingerprint collation function loaded therein, the present invention may be formed as an input device in which a fingerprint detection function is included by providing a fingerprint detecting portion and/or a memory, etc. within the casing without using the IC card 40 having the fingerprint collation function.

Further, the input device to which the present invention is applied is usable not only for the electrostatic capacity type detection method, but also for the optical type detection method. In the optical detection method, the fingerprint detecting portion of the IC card 40 includes an image pick-up unit, such as a CCD or a line sensor, etc., and a back light for irradiating a pressing portion onto which the fingertip is pressed. When a finger is pressed against the fingerprint detecting portion, the back light is turned ON to pick up the image of the fingerprint at the image pick-up unit. The fingerprint detecting portion extracts feature points of the fingerprint, e.g., branch or center of skin upheaval lines from the imaged fingerprint. When a fingerprint registration is carried out, the fingerprint detecting portion outputs to the first memory 52 fingerprint data consisting of feature points of the fingerprint. Further, fingerprint data consisting of feature points of a fingerprint to be registered is preserved in the first memory 52 for every identification number. The fingerprint detecting portion outputs the fingerprint data to the collation unit 53 when fingerprint collation is carried out.

In the input device provided with a fingerprint detecting portion using the optical type detection method, the provision of the shutter member 20 which opens or closes the opening portion 17 which faces the fingerprint detecting portion prevents dust, etc. from being admitted into the loading portion 15 when an IC card 40 is not loaded therein. Thus, it is possible to prevent the connector 18 from becoming coated by dust, etc. In addition, when an IC card 40 is loaded within loading portion 15, dust, etc. is prevented from being deposited on the image pick-up unit such as a CCD, etc. Thus, it is possible to precisely detect fingerprints.

Figure 11:
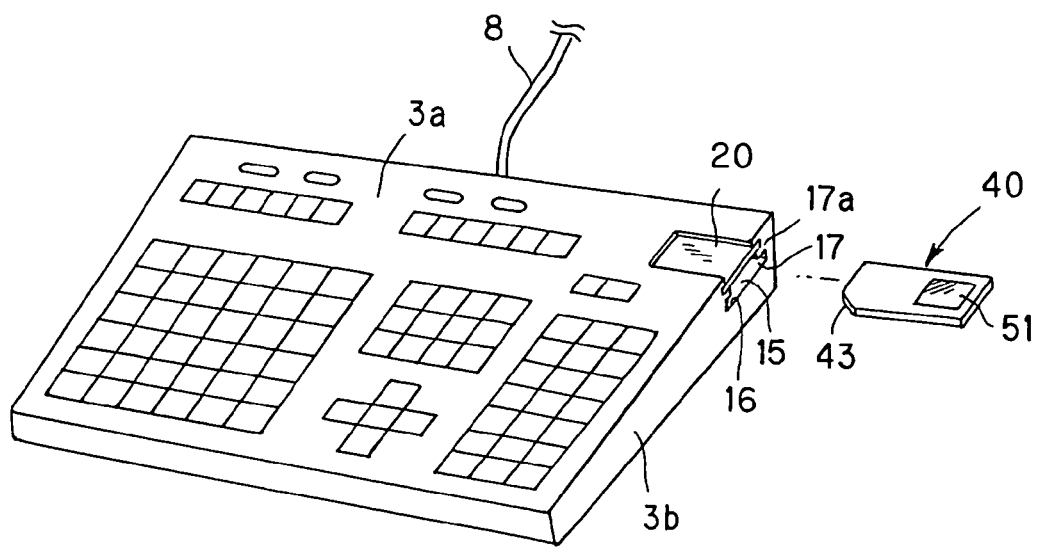
FIG. 11 is a perspective view showing a further input device to which the present invention is applied.
Figure 12:
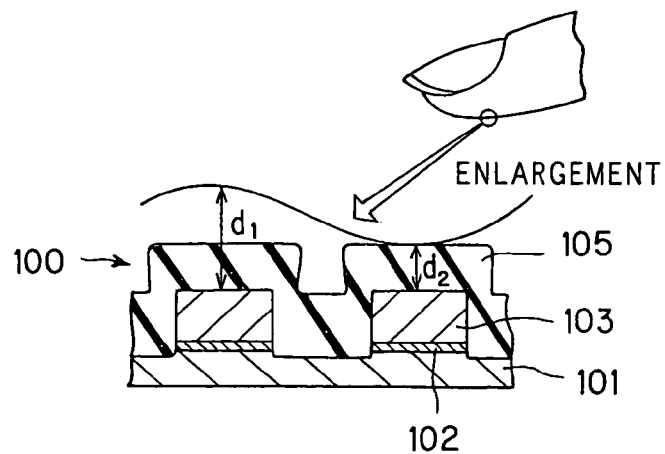
FIG. 12 is a schematic, cross-sectional view showing the use state of a fingerprint sensor.

It is to be noted that, in the present invention, in addition to the mouse 5 as described above, an IC card 40 having a fingerprint collation function may be loaded with respect to various input devices such as a remote control device for carrying out remote control of electronic equipment, etc. For example, the present invention may be applied to a keyboard 3 that, along with the mouse 5, is most frequently handled by the user at the time the information processing apparatus 1 is used. As shown in FIG. 11, the loading portion 15 is provided in keyboard 3 in such a manner that an insertion hole 16 is provided on a side surface 3b of the keyboard 3 adjacent an upper surface 3a thereof. Further, an opening portion 17 for exposing the fingerprint detecting portion 51 of the IC card 40 to the exterior is provided at the upper surface 3a so as to make it easy to carry out fingerprint collation work. The opening portion 17 is adapted to have an opening on the side surface 3b of the keyboard 3 to make it easy to take out the IC card 40 through the insertion hole 16.

Further, a side surface 17a of the opening portion 17 includes a curve protruding toward the exterior, and is adapted so that a fingertip is easily inserted in carrying out fingerprint collation and the user does not become tired in view of human-engineering. Further, shutter member 20 is disposed in the opening portion 17 to prevent dust, etc. from being deposited on connector 18 with respect to an IC card 40 inserted within the loading portion 15 and/or a fingerprint detecting portion 51 of the IC card, and for removing static electricity charged on the finger of the user during fingerprint collation. It is to be noted that an IC card as an external memory unit may be loaded with respect to the loading portion 15.

Moreover, the connection between the information processing apparatus 1 and the mouse 5 is not limited to the above-described USB, but an interface such as IEEE (Institute of Electrical and Electronics Engineers) 1394, etc. may be employed, and both wired systems and wireless systems may be employed. Further, the transmission/reception of data between the IC card 40 attached at the loading portion 15 and the mouse 5 also may be carried out by a wireless system. In addition, it is possible to load plural IC cards in the loading portion 15. In this case, an IC card 40 for fingerprint collation and an IC card for memory may be loaded in the loading portion 15, e.g., in a laminated manner.

As explained above in detail, in accordance with the input device of the present invention, even in the case of host equipment having only a few connecting portions, an IC card having a fingerprint collation function may be loaded with respect to a loading portion of the input device, thereby making it possible to easily add a fingerprint collation function to the host equipment. Further, since this input device is a device that a user most frequently handles at the time the host equipment is used, it is easy to press a fingertip onto the fingerprint detecting portion.

Further, in accordance with the present invention, since the input device is provided with a fingerprint detecting portion for detecting the fingerprint of the user, and a shutter member in an opening portion which exposes the fingerprint detecting portion to the exterior, the fingerprint detecting portion can be closed by the shutter member when fingerprint detection is not carried out. Accordingly, it is possible to prevent dust, etc. from being admitted to deposit on the fingerprint detecting portion.

In addition, in accordance with the input device of the present invention, a metallic shutter member is provided, thereby making it possible to remove static electricity charged on the finger of the user before fingerprint detection is performed. Accordingly, the fingerprint detecting portion can precisely detect the fingerprint of the user.

The invention claimed is:

1. An input device, comprising:
a device body having an operating unit operatively connected to a host device for carrying out operations of the host device;
a loading portion in the device body;
an opening portion in the device body;
a fingerprint detecting IC card assembled in the device body through the loading portion and operable to be exposed to the exterior of the device body through the opening portion, the fingerprint detecting portion serving to detect a fingerprint of a user when exposed; and
a shutter member movable between a first position and a second position, wherein when the shutter member is in the first position the fingerprint detecting IC card is exposed to the exterior of the device body through the opening portion, and when the shutter member is in the second position the shutter member overlays the opening portion so that the fingerprint detecting IC card is substantially shielded from the exterior of the device body.

2. The input device as set forth in claim 1, wherein a side surface of the opening portion has a projecting curve.

3. The input device as set forth in claim 1
wherein the shutter member includes an electrically conductive plate-shaped body.

4. The input device as set forth in claim 1, further comprising:
a holding member pivotably supported within the device body;
an actuating member assembled to the device body adjacent one end of the holding member, and being operable from an exterior of the device body;
a projecting portion formed at the other end of the holding member and adapted to engage the shutter member when the shutter member is in the first position; and
a biasing member disposed in the device body for biasing the shutter member toward the second position;
wherein the projecting portion engages the shutter member when the shutter member is in the first position to keep the shutter member from moving, and the actuating member is operable to release the projecting portion from the shutter member whereby the biasing member biases the shutter member toward the second position to close the opening portion.

5. The input device as set forth in claim 1, further comprising:
a biasing member disposed in the device body,
the biasing member biasing the shutter member toward the second position as the shutter member is moved from the second position toward the first position, and biasing the shutter member toward the first position as the shutter member is moved from the first position toward the second position.

6. The input device as set forth in claim 1,
wherein the fingerprint detecting portion measures differences in electrostatic capacity corresponding to fingerprint patterns to thereby detect a fingerprint.

7. The input device as set forth in claim 1, wherein the input device is a mouse device.

8. The input device as set forth in claim 7, wherein the loading portion comprises:
an insertion hole in the device body sized that is shaped for inserting the IC card in an assembled position in the device body, the insertion hole facing toward the operating unit on the device body.

9. The input device as set forth in claim 7, wherein the loading portion comprises:
an insertion hole in the device body sized that is shaped for inserting the IC card in an assembled position in the device body, the insertion hole facing away from the operating unit on the device body.

* * * * *